(12) United States Patent
Frey

(10) Patent No.: US 10,302,805 B2
(45) Date of Patent: May 28, 2019

(54) SYSTEM AND METHODS FOR OBTAINING COMPENSATED ELECTROMAGNETIC MEASUREMENTS

(71) Applicant: Schlumberger Technology Corporation, Sugar Land, TX (US)

(72) Inventor: Mark T. Frey, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 117 days.

(21) Appl. No.: 15/126,648

(22) PCT Filed: Mar. 26, 2015

(86) PCT No.: PCT/US2015/022815
§ 371 (c)(1),
(2) Date: Sep. 16, 2016

(87) PCT Pub. No.: WO2015/153294
PCT Pub. Date: Oct. 8, 2015

(65) Prior Publication Data
US 2017/0082776 A1    Mar. 23, 2017

Related U.S. Application Data

(60) Provisional application No. 61/972,330, filed on Mar. 30, 2014.

(51) Int. Cl.
*G01V 3/30* (2006.01)
*E21B 47/00* (2012.01)
(Continued)

(52) U.S. Cl.
CPC ............... *G01V 3/38* (2013.01); *E21B 47/00* (2013.01); *E21B 49/00* (2013.01); *G01V 3/30* (2013.01); *E21B 47/12* (2013.01)

(58) Field of Classification Search
CPC ............ G01V 3/38; E21B 47/00; E21B 49/00
(Continued)

(56) References Cited

U.S. PATENT DOCUMENTS

| 4,899,112 A * | 2/1990 | Clark ....................... G01V 3/30 |
| | | 324/338 |
| 2003/0085707 A1 | 5/2003 | Minerbo et al. |

(Continued)

FOREIGN PATENT DOCUMENTS

| EP | 2320251 A2 | 5/2011 |
| WO | 2013123293 A1 | 8/2013 |

OTHER PUBLICATIONS

International Search Report and Written Opinion issued in International Patent application PCT/US2015/022815, dated Aug. 24, 2015. 8 pages.

(Continued)

*Primary Examiner* — Eman A Alkafawi

(57) ABSTRACT

A method for making downhole electromagnetic logging while drilling measurements includes rotating an electromagnetic logging while drilling tool in a subterranean wellbore. The logging while drilling tool includes at least first and second tilted transmitter antennas longitudinally spaced along a logging while drilling tool body and at least first and second tilted receiver antennas. A plurality of electromagnetic voltage measurements is acquired at the first and second tilted receiver antennas while rotating and processed to compute harmonic voltage coefficient. Ratios of selected ones of the harmonic voltage coefficients are then processed to compute at least one gain compensated measurement quantity.

18 Claims, 6 Drawing Sheets

(51) Int. Cl.
*E21B 49/00* (2006.01)
*G01V 3/38* (2006.01)
*E21B 47/12* (2012.01)

(58) Field of Classification Search
USPC .......................................................... 702/7
See application file for complete search history.

(56) References Cited

U.S. PATENT DOCUMENTS

| | | |
|---|---|---|
| 2005/0140373 A1 | 6/2005 | Li et al. |
| 2006/0253255 A1 | 11/2006 | Omeragic et al. |
| 2009/0015261 A1* | 1/2009 | Yang ................... G01V 3/28 324/343 |
| 2011/0074427 A1 | 3/2011 | Wang et al. |
| 2011/0238312 A1 | 9/2011 | Seydoux et al. |
| 2011/0291855 A1* | 12/2011 | Homan ................ G01V 3/30 340/853.2 |
| 2011/0309833 A1* | 12/2011 | Yang ................... G01V 3/28 324/338 |
| 2013/0166213 A1 | 6/2013 | Homan et al. |
| 2013/0191028 A1* | 7/2013 | Homan ................ G01V 3/28 702/7 |
| 2014/0292340 A1* | 10/2014 | Yang ................... G01V 3/28 324/338 |
| 2016/0209540 A1 | 7/2016 | Frey et al. |

OTHER PUBLICATIONS

International Preliminary Report on Patentability issued in International Patent application PCT/US2015/022815, dated Oct. 4, 2016, 6 pages.

Search and Examination Report issued in European Patent application 15773422.9 dated Oct. 17, 2017, 8 pages.

\* cited by examiner

SYSTEM AND METHODS FOR OBTAINING COMPENSATED ELECTROMAGNETIC MEASUREMENTS

CROSS REFERENCE TO RELATED APPLICATIONS

This application claims the benefit of U.S. Provisional Application Ser. No. 61/972,330 entitled Compensated UHR and UHA-like Measurements, filed Mar. 30, 2014.

FIELD OF THE INVENTION

Disclosed embodiments relate generally to downhole electromagnetic logging methods and more particularly to a logging tool and a method for making gain compensated directional propagation measurements using tilted antennas.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Methods for employing axial and transverse antennas for acquiring fully gain compensated measurements of the three-dimensional impedance tensor of the formation have been disclosed. While such measurements advantageously contain information on formation resistivity anisotropy, dip, bed boundaries and other aspects of formation geometry, their use may require extensive retooling (i.e., the use of new downhole hardware). Commercial logging tools commonly make use of tilted antennas to obtain directional resistivity measurements. However, such measurements can be susceptible to gain mismatch errors as there are no known methods for providing fully gain compensated propagation measurements using tilted antennas.

SUMMARY

A method for making downhole electromagnetic logging while drilling measurements is disclosed. The method includes rotating an electromagnetic logging while drilling tool in a subterranean wellbore. The logging while drilling tool includes at least first and second tilted transmitter antennas longitudinally spaced along a logging while drilling tool body and at least first and second tilted receiver antennas. A plurality of electromagnetic voltage measurements is acquired at the first and second tilted receiver antennas while rotating and processed to compute harmonic voltage coefficient. Ratios of selected ones of the harmonic voltage coefficients are then processed to compute at least one gain compensated measurement quantity.

The disclosed embodiments may provide various technical advantages. For example, the disclosed methodology provides a means for obtaining fully gain compensated measurement quantities using a commercially available tool architecture having tilted transmitter and receiver antennas.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
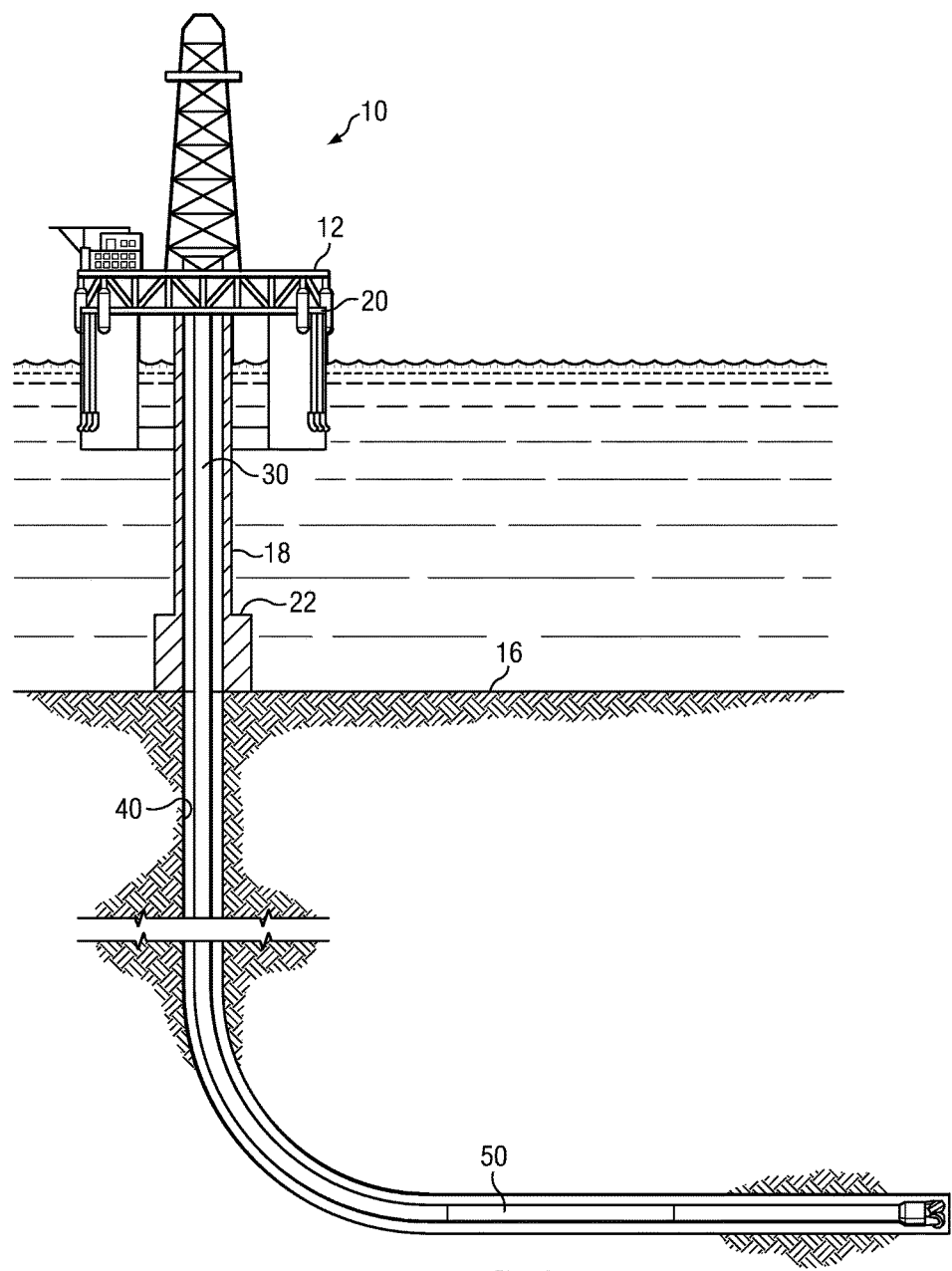
FIG. 1 depicts one example of a drilling rig on which the disclosed electromagnetic logging methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make directional electromagnetic logging measurements. As described in more detail below the electromagnetic measurement tool 50 may include multiple tilted antennas deployed on a logging while drilling tool body.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
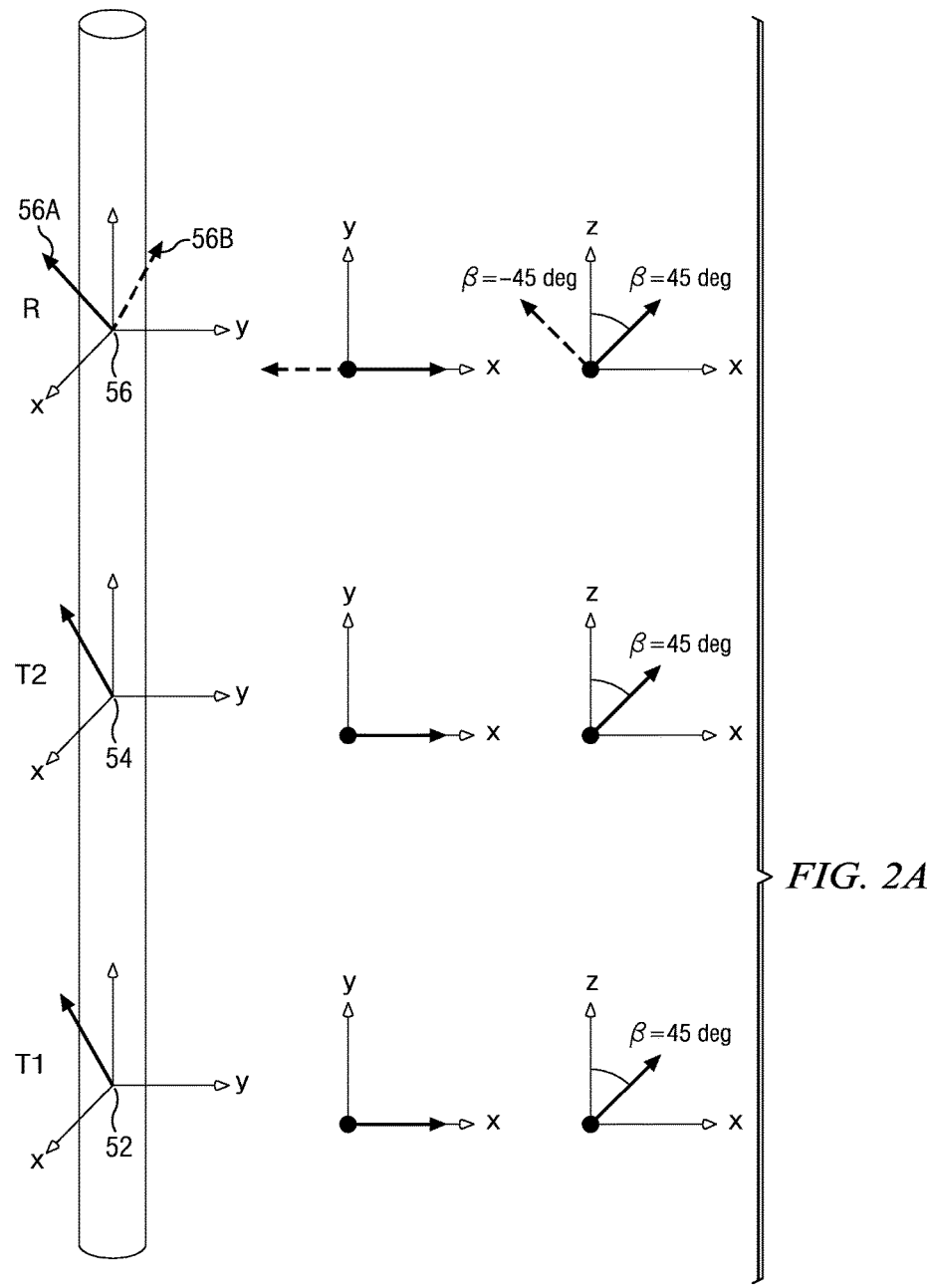
FIG. 2A schematically depicts the transmitter and receiver antenna moments in one example of the electromagnetic logging tool shown on FIG. 1.

FIG. 2A schematically depicts the transmitter and receiver antenna moments in one example of the electromagnetic measurement tool 50 shown on FIG. 1. In the depicted embodiment measurement tool 50 includes first and second axially spaced transmitters 52 and 54 and a receiver 56 deployed on a logging while drilling tool body 51. The transmitters 52 and 54 may be located on one axially side of the receiver 56 as depicted although the disclosure is not limited in this regard. As described in more detail below, each of the transmitters 52 and 54 and receivers 56 includes at least one tilted antenna. As is known to those of ordinary skill in the art, a tilted antenna is neither axial nor transverse. In other words the antenna moment is neither parallel with nor perpendicular to the longitudinal axis of the tool (conventionally referred to as the z-axis), but is tilted with respect to the tool axis (e.g., at a 45 degree angle).

In the embodiment shown on FIG. 2A, the transmitters T1 and T2 (52 and 54) may be tilted at the same orientation, e.g., at 45 degrees with respect to the x- and z-axes. The receiver R 56 may include first and second receiver antennas 56A and 56B oriented in an "up down" configuration in which the first receiver antenna 56A is tilted towards the uphole direction (having a positive tilt angle β) and the second receiver antenna 56B is tilted towards the downhole direction (having a negative tilt angle β). It will be understood that the disclosed embodiments are not limited to configuration such as that depicted on FIG. 2A, nor are the tilt angles necessarily 45 degrees.

Figure 2B:
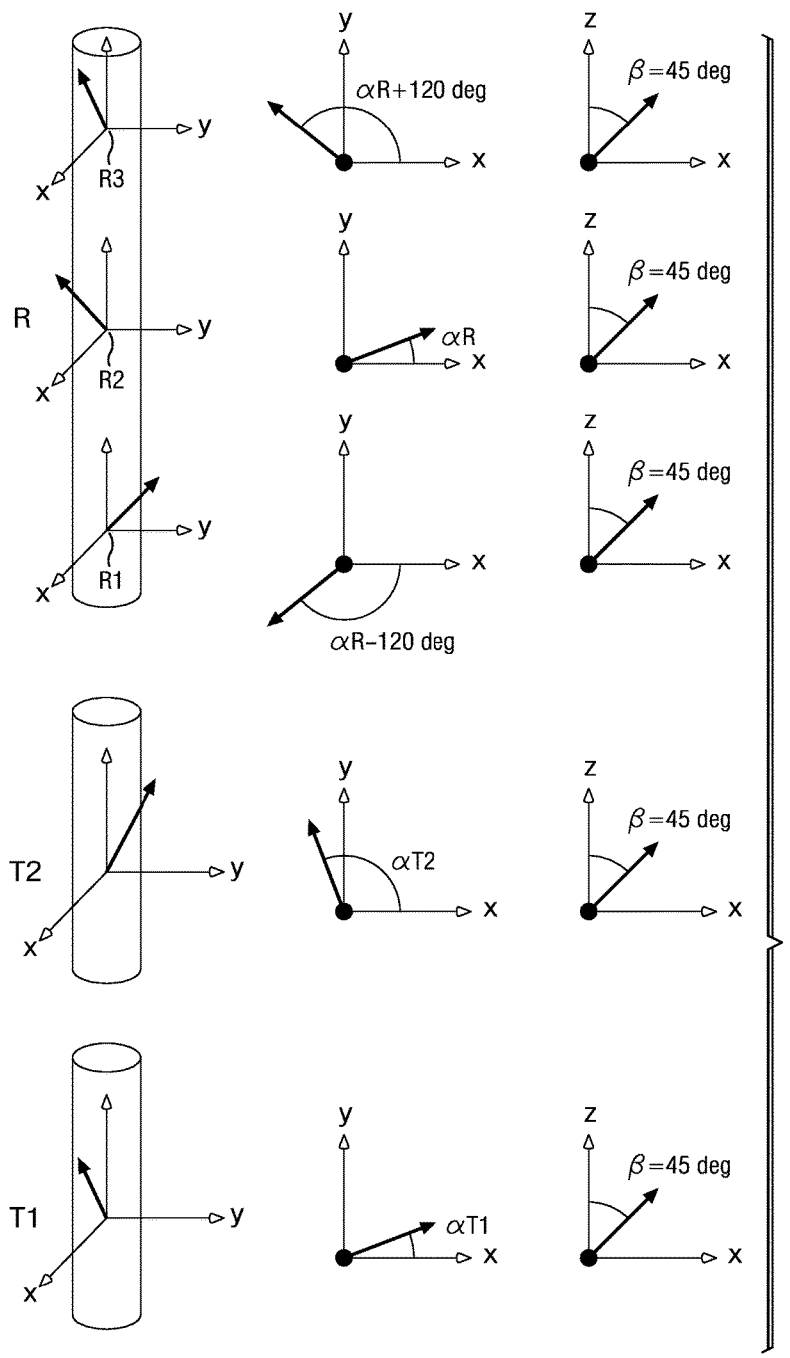
FIG. 2B schematically depicts the transmitter and receiver antenna moments in another example of the electromagnetic logging tool shown on FIG. 1.

With continued reference to FIG. 2A, it will be understood that transmitters T1 and T2 do not necessarily have the same alignment angle (i.e., they do not need to be rotationally aligned about the tool axis). For example, in a deep reading measurement tool, the transmitters may be deployed on separate subs such that their respective alignment angles are arbitrary on make-up of the tool string. One such embodiment is depicted on FIG. 2B in which transmitters T1 and T2 have alignment angles $\alpha_{T1}$ and $\alpha_{T2}$ with respect to the x-axis. In such embodiments, the receiver R may include three tilted antennas R1, R2, and R3 having alignment angles spaced at 120 degree intervals (e.g., at $\alpha_R$, $\alpha_R+120$, and $\alpha_R-120$ degrees with respect to the x-axis). The receivers R1, R2, and R3 may be collocated or non-collocated (as in the depicted embodiment). The disclosed embodiments are not limited in this regard.

Figure 3:
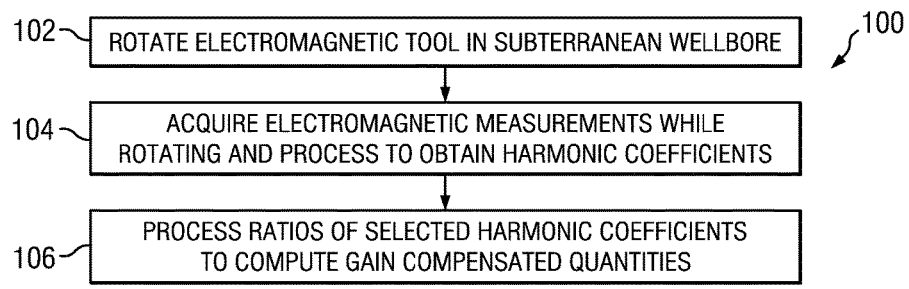
FIG. 3 depicts a flow chart of one disclosed method embodiment for obtaining gain compensated measurement quantities.

FIG. 3 depicts a flow chart of one disclosed method embodiment 100 for obtaining gain compensated directional propagation measurements. An electromagnetic measurement tool including tilted transmitters and tilted receivers (e.g., one of the measurement tools depicted on FIGS. 2A and 2B) is rotated in a subterranean wellbore at 102. Electromagnetic measurements are acquired at 104 while the tool is rotating and processed to obtain harmonic voltage coefficients. Ratios of selected harmonic voltage coefficients may then be processed to compute gain compensated measurement quantities at 106.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae can be processed, as is known to those of ordinary skill in the art, to obtain one or more properties of the formation.

In general the earth is anisotropic such that its electrical properties may be expressed as a three-dimensional tensor that contains information on formation resistivity anisotropy, dip, bed boundaries and other aspects of formation geometry. For example, a three-dimensional impedance tensor Z may be expressed as follows:

$$Z = \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \quad (1)$$

where Z represents the impedance tensor, which depends on the electrical and magnetic properties of the environment surrounding the antenna pair in addition to the frequency, geometry, and spacing of the antennas. The subscripts x, y, and z indicate the orientation of the inductive couplings in the tool reference frame.

For a rotating tool (with the moments rotating about the same axis), the coupling tensor is rotated. Measurements at each angle of rotation θ may be represented as projections of the rotated tensor on the transmitter and receiver moments scaled by their respective gains, for example, as follows:

$$V = G_T m_T (R_T^t Z R_R) G_R \quad (2)$$

where Z is defined above, $G_T$ and $G_R$ are diagonal matrices representing the transmitter and receiver gains, $R_T$ and $R_R$ are rotation matrices that express rotations of the receiver and transmitter moments about their respective axes, $m_T$ and $m_R$ represent moments of the transmitter and receiver antennas, and the superscript t represents the transpose of the corresponding matrix. The gain matrices $G_T$ and $G_R$ may be represented, for example, as follows:

$$G_T = \begin{bmatrix} g_{Tx} & 0 & 0 \\ 0 & g_{Ty} & 0 \\ 0 & 0 & g_{Tz} \end{bmatrix} \quad (3)$$

$$G_R = \begin{bmatrix} g_{Rx} & 0 & 0 \\ 0 & g_{Ry} & 0 \\ 0 & 0 & g_{Rz} \end{bmatrix} \quad (4)$$

When the transmitter and receiver share the same axis (e.g., the z axis which represents the longitudinal axis of the tool), the rotation matrices $R_T$ and $R_R$ may be expressed, for example, as follows:

$$R_\theta = R_T = R_R = \begin{bmatrix} \cos(\theta) & -\sin(\theta) & 0 \\ \sin(\theta) & \cos(\theta) & 0 \\ 0 & 0 & 1 \end{bmatrix} \quad (5)$$

The rotated couplings (shown in the parentheses in Equation 2) may then be expressed mathematically in harmonic form, for example, as follows:

$$R_T^t Z R_R = Z_{DC} + Z_{FHC} \cos(\theta) + Z_{FHS} \sin(\theta) + Z_{SHC} \cos(2\theta) + Z_{SHS} \sin(2\theta) \quad (6)$$

where $Z_{DC}$ represents a DC (average) coupling coefficient, $Z_{FHC}$ and $Z_{FHS}$ represent first order harmonic cosine and first order harmonic sine coefficients, and $Z_{SHC}$ and $Z_{SHS}$ represent second order harmonic cosine and second order harmonic sine coefficients of the transmitter receiver couplings. These coefficients are shown below:

$$Z_{DC} = \begin{bmatrix} \frac{Z_{xx}+Z_{yy}}{2} & \frac{Z_{xy}-Z_{yx}}{2} & 0 \\ -\frac{Z_{xy}-Z_{yx}}{2} & \frac{Z_{xx}+Z_{yy}}{2} & 0 \\ 0 & 0 & Z_{zz} \end{bmatrix} \quad (7)$$

$$Z_{FHC} = \begin{bmatrix} 0 & 0 & Z_{xz} \\ 0 & 0 & z_{yz} \\ Z_{zx} & Z_{zy} & 0 \end{bmatrix}$$

$$Z_{FHS} = \begin{bmatrix} 0 & 0 & Z_{yz} \\ 0 & 0 & -Z_{xz} \\ Z_{zy} & -Z_{zx} & 0 \end{bmatrix}$$

$$Z_{SHC} = \begin{bmatrix} \frac{Z_{xx}-Z_{yy}}{2} & \frac{Z_{xy}+Z_{yx}}{2} & 0 \\ \frac{Z_{xy}+Z_{yx}}{2} & -\frac{Z_{xx}-Z_{yy}}{2} & 0 \\ 0 & 0 & 0 \end{bmatrix}$$

$$Z_{SHS} = \begin{bmatrix} \frac{Z_{xy}+Z_{yx}}{2} & -\frac{Z_{xx}-Z_{yy}}{2} & 0 \\ -\frac{Z_{xx}-Z_{yy}}{2} & \frac{Z_{xy}+Z_{yx}}{2} & 0 \\ 0 & 0 & 0 \end{bmatrix}$$

In practice, the receiving antenna voltages may be measured while the tool rotates in the borehole. Following the form of Equation 6, the measured voltages may be expressed mathematically in terms of its harmonic voltage coefficients, for example, as follows thereby enabling the harmonic voltage coefficients to be obtained:

$$V = V_{DC} + V_{FHC}\cos(\theta) + V_{FHS}\sin(\theta) + V_{SHC}\cos(2\theta) + V_{SHS}\sin(2\theta) \quad (8)$$

wherein where $V_{DC}$ represents a DC voltage coefficient, $V_{FHC}$ and $V_{FHS}$ represent first order harmonic cosine and first order harmonic sine voltage coefficients (also referred to herein as first harmonic cosine and first harmonic sine voltage coefficients), and $V_{SHC}$ and $V_{SHS}$ represent second order harmonic cosine and second order harmonic sine voltage coefficients (also referred to herein as second harmonic cosine and second harmonic sine voltage coefficients) of the transmitter receiver couplings.

With continued reference to FIG. 3, the electromagnetic measurements may be acquired and processed at 104 to obtain harmonic voltage coefficients, for example, as describe above with respect to Equations 1 through 8. The measured voltages may be related to the impedances between the transmitter and receiver antennas as also described above.

Consider first a tool embodiment as depicted on FIG. 2A including first and second non-collocated tilted transmitters T1 and T2 and a receiver including first and second collocated tilted receiver antennas R1 and R2 that are all rotationally aligned with one another. In such an embodiment, the rotated couplings between the T1 transmitter and the collocated receiver location may be expressed, for example, as follows:

$$Z_{DC\_T1} = \begin{bmatrix} \frac{Z_{xx1}+Z_{yy1}}{2} & \frac{Z_{xy1}-Z_{yx1}}{2} & 0 \\ -\frac{Z_{xy1}-Z_{yx1}}{2} & \frac{Z_{xx1}+Z_{yy1}}{2} & 0 \\ 0 & 0 & Z_{zz1} \end{bmatrix} \quad (9)$$

$$Z_{FHC\_T1} = \begin{bmatrix} 0 & 0 & Z_{xz1} \\ 0 & 0 & z_{yz1} \\ Z_{zx1} & Z_{zy1} & 0 \end{bmatrix}$$

$$Z_{FHS\_T1} = \begin{bmatrix} 0 & 0 & Z_{yz1} \\ 0 & 0 & -Z_{xz1} \\ Z_{zy1} & -Z_{zx1} & 0 \end{bmatrix}$$

$$Z_{SHC\_T1} = \begin{bmatrix} \frac{Z_{xx1}-Z_{yy1}}{2} & \frac{Z_{xy1}+Z_{yx1}}{2} & 0 \\ \frac{Z_{xy1}+Z_{yx1}}{2} & -\frac{Z_{xx1}-Z_{yy1}}{2} & 0 \\ 0 & 0 & 0 \end{bmatrix}$$

$$Z_{SHS\_T1} = \begin{bmatrix} \frac{Z_{xy1}+Z_{yx1}}{2} & -\frac{Z_{xx1}-Z_{yy1}}{2} & 0 \\ -\frac{Z_{xx1}-Z_{yy1}}{2} & \frac{Z_{xy1}+Z_{yx1}}{2} & 0 \\ 0 & 0 & 0 \end{bmatrix}$$

The rotated couplings between the T2 transmitter and the collocated receiver location may be expressed, for example, as follows:

$$Z_{DC\_T2} = \begin{bmatrix} \frac{Z_{xx2}+Z_{yy2}}{2} & \frac{Z_{xy2}-Z_{yx2}}{2} & 0 \\ -\frac{Z_{xy2}-Z_{yx2}}{2} & \frac{Z_{xx2}+Z_{yy2}}{2} & 0 \\ 0 & 0 & Z_{zz2} \end{bmatrix} \quad (10)$$

$$Z_{FHC\_T2} = \begin{bmatrix} 0 & 0 & Z_{xz2} \\ 0 & 0 & Z_{yz2} \\ Z_{zx2} & Z_{zy2} & 0 \end{bmatrix}$$

$$Z_{FHS\_T2} = \begin{bmatrix} 0 & 0 & Z_{yz2} \\ 0 & 0 & -Z_{xz2} \\ Z_{zy2} & -Z_{zx2} & 0 \end{bmatrix}$$

$$Z_{SHC\_T2} = \begin{bmatrix} \frac{Z_{xx2}-Z_{yy2}}{2} & \frac{Z_{xy2}+Z_{yx2}}{2} & 0 \\ \frac{Z_{xy2}+Z_{yx2}}{2} & -\frac{Z_{xx2}-Z_{yy2}}{2} & 0 \\ 0 & 0 & 0 \end{bmatrix}$$

$$Z_{SHS\_T2} = \begin{bmatrix} \frac{Z_{xy2}+Z_{yx2}}{2} & -\frac{Z_{xx2}-Z_{yy2}}{2} & 0 \\ -\frac{Z_{xx2}-Z_{yy2}}{2} & \frac{Z_{xy2}+Z_{yx2}}{2} & 0 \\ 0 & 0 & 0 \end{bmatrix}$$

The measured voltage harmonics between the T1 and T2 transmitters and the collocated receiver antennas R1 and R2 may be computed using the foregoing equations. For example, when the transmitters have the same tilt angle $\beta_T$ and the receivers have the same tilt angle magnitude (but are of opposite signs such that $\beta_{R1} = -\beta_{R2}$), the transmitter moments and gains and the receiver moments and gains may be expressed as follows:

$$m_{T1} = m_{T2} = \begin{bmatrix} \cos(0)\sin(\beta_T) & 0 & 0 \\ \sin(0)\sin(\beta_T) & 0 & 0 \\ \cos(\beta_T) & 0 & 0 \end{bmatrix} \quad (11)$$

$$G_{T1} = \begin{bmatrix} g_{T1} & 0 & 0 \\ 0 & 0 & 0 \\ 0 & 0 & 0 \end{bmatrix}; G_{T2} = \begin{bmatrix} g_{T2} & 0 & 0 \\ 0 & 0 & 0 \\ 0 & 0 & 0 \end{bmatrix}$$

$$m_R = \begin{bmatrix} \sin(\beta_T) & -\sin(\beta_T) & 0 \\ 0 & 0 & 0 \\ \cos(\beta_T) & \cos(\beta_T) & 0 \end{bmatrix}$$

$$G_R = \begin{bmatrix} g_{R1} & 0 & 0 \\ 0 & g_{R2} & 0 \\ 0 & 0 & 0 \end{bmatrix}$$

The voltage harmonics at the receiver antennas R1 and R2 when transmitters T1 and T2 fire may then be given as follows when the tilt angles of the transmitters and receivers are 45 degrees (it will be understood 45 degree tilt angles simplify the mathematical expressions and therefore the presentation thereof, however the disclosed embodiments are in no way limited in this regard):

$$V_{DC\_T1} = \begin{bmatrix} \frac{g_{R1}g_{T1}(Z_{xx1}+Z_{yy1}+2Z_{zz1})}{4} & \frac{g_{R2}g_{T1}(Z_{xx1}+Z_{yy1}-2Z_{zz1})}{4} & 0 \\ 0 & 0 & 0 \\ 0 & 0 & 0 \end{bmatrix} \quad (12)$$

$$V_{FHC\_T1} = \begin{bmatrix} \frac{g_{R1}g_{T1}(Z_{xz1}+Z_{zx1})}{2} & \frac{g_{R2}g_{T1}(Z_{xz1}-Z_{zx1})}{2} & 0 \\ 0 & 0 & 0 \\ 0 & 0 & 0 \end{bmatrix}$$

$$V_{FHS\_T1} = \begin{bmatrix} \frac{g_{R1}g_{T1}(Z_{yz1}+Z_{zy1})}{2} & \frac{g_{R2}g_{T1}(Z_{yz1}-Z_{zy1})}{2} & 0 \\ 0 & 0 & 0 \\ 0 & 0 & 0 \end{bmatrix}$$

$$V_{SHC\_T1} = \begin{bmatrix} \frac{g_{R1}g_{T1}(Z_{xx1}-Z_{yy1})}{4} & \frac{g_{R2}g_{T1}(Z_{xx1}-Z_{yy1})}{4} & 0 \\ 0 & 0 & 0 \\ 0 & 0 & 0 \end{bmatrix}$$

$$V_{SHS\_T1} = \begin{bmatrix} \frac{g_{R1}g_{T1}(Z_{xy1}+Z_{yx1})}{4} & \frac{g_{R2}g_{T1}(Z_{xy1}+Z_{yx1})}{4} & 0 \\ 0 & 0 & 0 \\ 0 & 0 & 0 \end{bmatrix}$$

Similarly, the voltage harmonics at the receiver antennas R1 and R2 when transmitter T2 fires may be given as follows:

$$V_{DC\_T2} = \begin{bmatrix} \frac{g_{R1}g_{T2}(Z_{xx2}+Z_{yy2}+2Z_{zz2})}{4} & \frac{g_{R2}g_{T2}(Z_{xx2}+Z_{yy2}-2Z_{zz2})}{4} & 0 \\ 0 & 0 & 0 \\ 0 & 0 & 0 \end{bmatrix} \quad (13)$$

$$V_{FHC\_T2} = \begin{bmatrix} \frac{g_{R1}g_{T2}(Z_{xz2}+Z_{zx2})}{2} & \frac{g_{R2}g_{T2}(Z_{xz2}-Z_{zx2})}{2} & 0 \\ 0 & 0 & 0 \\ 0 & 0 & 0 \end{bmatrix}$$

$$V_{FHS\_T2} = \begin{bmatrix} \frac{g_{R1}g_{T2}(Z_{yz2}+Z_{zy2})}{2} & \frac{g_{R2}g_{T1}(Z_{yz2}-Z_{zy2})}{2} & 0 \\ 0 & 0 & 0 \\ 0 & 0 & 0 \end{bmatrix}$$

$$V_{SHC\_T2} = \begin{bmatrix} \frac{g_{R1}g_{T2}(Z_{xx2}-Z_{yy2})}{4} & \frac{g_{R2}g_{T2}(Z_{xx2}-Z_{yy2})}{4} & 0 \\ 0 & 0 & 0 \\ 0 & 0 & 0 \end{bmatrix}$$

$$V_{SHS\_T2} = \begin{bmatrix} \frac{g_{R1}g_{T2}(Z_{xy2}+Z_{yx2})}{4} & \frac{g_{R2}g_{T2}(Z_{xy2}+Z_{yx2})}{4} & 0 \\ 0 & 0 & 0 \\ 0 & 0 & 0 \end{bmatrix}$$

Selected ratios of the DC, first harmonic cosine, and first harmonic sine voltage coefficients given in Equations 12-13 may be processed at 106, for example, to compute various gain compensated measurement quantities. For example, the DC coefficients may be combined as follows gain compensated 'DC' resistivity measurement:

$$R_{DC} = \frac{V_{DC\_T1R2} \cdot V_{DC\_T2R1}}{V_{DC\_T1R1} \cdot V_{DC\_T2R2}} = \frac{(Z_{xx1}+Z_{yy1}-2Z_{zz1})}{(Z_{xx2}+Z_{yy2}+2Z_{zz2})} \cdot \frac{(Z_{xx2}+Z_{yy2}-2Z_{zz2})}{(Z_{xx1}+Z_{yy1}+2Z_{zz1})} \quad (14)$$

where the subscripts R1 and R2 indicate the left and center columns respectively in Equations 12 and 13. It will be understood that when transmitter T2 is in close proximity to the collocated receiver antennas the couplings are not particularly sensitive to the formation resistivity and approach values they would have at zero conductivity such that:

$$\frac{Z_{xx2}+Z_{yy2}}{2Z_{zz2}} \approx \frac{1}{2}$$

$$\frac{Z_{xx2}+Z_{yy2}+2Z_{zz2}}{Z_{xx2}+Z_{yy2}-2Z_{zz2}} \approx -3$$

Thus when T2 is in close proximity to the collocated receiver antennas Equation 14 reduces to the following:

$$R_{DC} \approx \frac{-3(Z_{xx1}+Z_{yy1}-2Z_{zz1})}{(Z_{xx1}+Z_{yy1}+2Z_{zz1})} \quad (15)$$

Gain compensated symmetrized and anti-symmetrized directional measurements may also be obtained from the voltage measurements described above with respect to Equations 12 and 13. For example, gain compensated symmetrized quantities $S_1$ and $S_2$ may be computed using the following ratios:

$$S_1 = \frac{V_{FHC\_T1R2}}{V_{DC\_T1R2}} = \frac{2(Z_{xz1} - Z_{zx1})}{(Z_{xx1} + Z_{yy1} - 2Z_{zz1})} \quad (16)$$

$$S_2 = \frac{V_{FHS\_T1R2}}{V_{DC\_T1R2}} = \frac{2(Z_{yz1} - Z_{zy1})}{(Z_{xx1} + Z_{yy1} - 2Z_{zz1})}$$

Likewise, gain compensated symmetrized quantities $A_1$ and $A_2$ may be computed using the following ratios:

$$A_1 = \frac{V_{FHC\_T1R1}}{V_{DC\_T1R1}} = \frac{2(Z_{xz1} + Z_{zx1})}{(Z_{xx1} + Z_{yy1} + 2Z_{zz1})} \quad (17)$$

$$A_2 = \frac{V_{FHS\_T1R1}}{V_{DC\_T1R1}} = \frac{2(Z_{yz1} + Z_{zy1})}{(Z_{xx1} + Z_{yy1} + 2Z_{zz1})}$$

Other gain compensated quantities may be computed using the second harmonic cosine and second harmonic sine components. For example, gain compensated quantities related to an xx–yy coupling may be obtained as follows:

$$R_{xx-yy(1)} = \frac{V_{SHC\_T1R1}}{V_{DC\_T1R1}} = \frac{(Z_{xx1} - Z_{yy1})}{(Z_{xx1} + Z_{yy1} + 2Z_{zz1})} \quad (18)$$

$$R_{xx-yy(2)} = \frac{V_{SHC\_T1R2}}{V_{DC\_T1R2}} = \frac{(Z_{xx1} - Z_{yy1})}{(Z_{xx1} + Z_{yy1} - 2Z_{zz1})}$$

Gain compensated quantities related to an xy+yx coupling may be obtained, for example, as follows:

$$R_{xy+yx(1)} = \frac{V_{SHS\_T1R1}}{V_{DC\_T1R1}} = \frac{2(Z_{xy1} + Z_{yx1})}{(Z_{xx1} + Z_{yy1} + 2Z_{zz1})} \quad (19)$$

$$R_{xy+yx(2)} = \frac{V_{SHS\_T1R2}}{V_{DC\_T1R2}} = \frac{2(Z_{xy1} + Z_{yx1})}{(Z_{xx1} + Z_{yy1} - 2Z_{zz1})}$$

Gain compensated quantities related to an xx/yy coupling (also referred to as an anisotropy measurement) may be computed, for example, as follows:

$$R_{xx/yy(1)} = \frac{V_{DC\_T1R1} + V_{SHC\_T1R1}}{V_{DC\_T1R1} - V_{SHC\_T1R1}} = \frac{Z_{xx1} + Z_{zz1}}{Z_{yy1} + Z_{zz1}} \quad (20)$$

$$R_{xx/yy(2)} = \frac{V_{DC\_T1R2} + V_{SHC\_T1R2}}{V_{DC\_T1R2} - V_{SHC\_T1R2}} = \frac{Z_{xx1} - Z_{zz1}}{Z_{yy1} - Z_{zz1}}$$

As described above with respect to FIGS. 2A and 2B, it will be understood that transmitters T1 and T2 do not necessarily have the same alignment angle (i.e., they do not need to be rotationally aligned about the tool axis). For example, in a deep reading measurement tool, the transmitters may be deployed on separate subs such their respective alignment angles are arbitrary on make-up of the tool string. In such embodiments, the receiver may include three tilted receiver antennas R1, R2, and R3 having alignment angles of –120, 0, and 120 degrees (–2π/3, 0, and 2π/3 radians). The receiver antennas may be collocated or non-collocated. The disclosed embodiments are not limited in this regard.

In such an embodiment, the transmitter moments and gains may be given, for example, as follows:

$$m_{T1} = \begin{bmatrix} \cos(\alpha_{T1})\sin(\beta_T) & 0 & 0 \\ \sin(\alpha_{T1})\sin(\beta_T) & 0 & 0 \\ \cos(\beta_T) & 0 & 0 \end{bmatrix}; \quad (21)$$

$$m_{T2} = \begin{bmatrix} \cos(\alpha_{T2})\sin(\beta_T) & 0 & 0 \\ \sin(\alpha_{T2})\sin(\beta_T) & 0 & 0 \\ \cos(\beta_T) & 0 & 0 \end{bmatrix}$$

$$G_{T1} = \begin{bmatrix} g_{T1} & 0 & 0 \\ 0 & 0 & 0 \\ 0 & 0 & 0 \end{bmatrix}; \quad G_{T2} = \begin{bmatrix} g_{T2} & 0 & 0 \\ 0 & 0 & 0 \\ 0 & 0 & 0 \end{bmatrix}$$

where $\alpha_{T1}$ and $\alpha_{T2}$ represent the alignment angles of the transmitters T1 and T2. The receiver moments and gains may be given, for example, as follows:

$$m_{R1} = \begin{bmatrix} \cos(\alpha_{R1} + 2\pi/3)\sin(\beta_R) & 0 & 0 \\ \sin(\alpha_{R1} + 2\pi/3)\sin(\beta_R) & 0 & 0 \\ \cos(\beta_R) & 0 & 0 \end{bmatrix}; \quad (22)$$

$$m_{R2} = \begin{bmatrix} \cos(\alpha_{R2})\sin(\beta_R) & 0 & 0 \\ \sin(\alpha_{R2})\sin(\beta_R) & 0 & 0 \\ \cos(\beta_R) & 0 & 0 \end{bmatrix};$$

$$m_{R3} = \begin{bmatrix} \cos(\alpha_{R1} - 2\pi/3)\sin(\beta_R) & 0 & 0 \\ \sin(\alpha_{R1} - 2\pi/3)\sin(\beta_R) & 0 & 0 \\ \cos(\beta_R) & 0 & 0 \end{bmatrix}$$

$$G_{R1} = \begin{bmatrix} g_{R1} & 0 & 0 \\ 0 & 0 & 0 \\ 0 & 0 & 0 \end{bmatrix}; \quad G_{R2} = \begin{bmatrix} g_{R2} & 0 & 0 \\ 0 & 0 & 0 \\ 0 & 0 & 0 \end{bmatrix};$$

$$G_{R2} = \begin{bmatrix} g_{R3} & 0 & 0 \\ 0 & 0 & 0 \\ 0 & 0 & 0 \end{bmatrix}$$

Since the receiver antennas are not necessarily collocated, the tensor harmonics for each of the transmitter receiver couplings are given separately. The TiRj couplings may be expressed, for example, as follows:

$$Z_{DC\_TiRj} = \begin{bmatrix} \frac{Z_{xxij} - Z_{yyij}}{2} & \frac{Z_{xyij} - Z_{yxij}}{2} & 0 \\ -\frac{Z_{xyij} - Z_{yxij}}{2} & \frac{Z_{xyij} - Z_{yxij}}{2} & 0 \\ 0 & 0 & Z_{zzij} \end{bmatrix} \quad (23)$$

$$Z_{FHC\_TiRj} = \begin{bmatrix} 0 & 0 & Z_{xzij} \\ 0 & 0 & Z_{yzij} \\ Z_{zxij} & Z_{zyij} & 0 \end{bmatrix}$$

$$Z_{FHS\_TiRj} = \begin{bmatrix} 0 & 0 & Z_{yzij} \\ 0 & 0 & -Z_{xzij} \\ Z_{zyij} & -Z_{zxij} & 0 \end{bmatrix}$$

$$Z_{SHC\_TiRj} = \begin{bmatrix} \frac{Z_{xxij} - Z_{yyij}}{2} & \frac{Z_{xyij} + Z_{yxij}}{2} & 0 \\ \frac{Z_{xyij} + Z_{yxij}}{2} & -\frac{Z_{xxij} - Z_{yyij}}{2} & 0 \\ 0 & 0 & 0 \end{bmatrix}$$

-continued $$Z_{SHS\_TiRj} = \begin{bmatrix} \frac{Z_{xyij} - Z_{yxij}}{2} & -\frac{Z_{xxij} + Z_{yyij}}{2} & 0 \\ -\frac{Z_{xxij} + Z_{yyij}}{2} & \frac{Z_{xyij} - Z_{yxij}}{2} & 0 \\ 0 & 0 & 0 \end{bmatrix}$$

where the subscript TiRj represents the coupling of the i-th transmitter (of T1 and T2) and the j-th receiver antenna (of R1, R2, and R3). In general i represents the transmitter number while j represents the receiver number. The DC voltages at the receiver antennas R1, R2, and R3 may be expressed, for example, as follows when the transmitter T1 fires:

$$V_{DC\_T1R2} = \frac{g_{R_1} g_{T_1} \left[ 2Z_{zz11} + Z_{xx11} \cos\left(\frac{2\pi}{3} + \alpha_R - \alpha_{T_1}\right) + Z_{yy11} \cos\left(\frac{2\pi}{3} + \alpha_R - \alpha_{T_1}\right) + Z_{xy11} \sin\left(\frac{2\pi}{3} + \alpha_R - \alpha_{T_1}\right) - Z_{yx11} \sin\left(\frac{2\pi}{3} + \alpha_R - \alpha_{T_1}\right) \right]}{4} \quad (24)$$

$$V_{DC_{T1R2}} = \frac{g_{R_2} g_{T_1} [2Z_{zz12} + Z_{xx12} \cos(\alpha_R - \alpha_{T1}) + Z_{yy12} \cos(\alpha_R - \alpha_{T1}) + Z_{xy12} \sin(\alpha_R - \alpha_{T1}) - Z_{yx12} \sin(\alpha_R - \alpha_{T1})]}{4}$$

$$V_{DC\_T1R3} = \frac{g_{R_3} g_{T_1} \left[ 2Z_{zz13} + Z_{xx13} \cos\left(\alpha_R - \frac{2\pi}{3} - \alpha_{T1}\right) + Z_{yy13} \cos\left(\alpha_R - \frac{2\pi}{3} - \alpha_{T1}\right) + Z_{xy13} \sin\left(\alpha_R - \frac{2\pi}{3} - \alpha_{T1}\right) - Z_{yx13} \sin\left(\alpha_R - \frac{2\pi}{3} - \alpha_{T1}\right) \right]}{4}$$

where $\alpha_{T1}$ and $\alpha_{T2}$ represent the alignment angles of the transmitters T1 and T2 with respect to a global x-direction and $\alpha_R$ represents the alignment angle of the second receiver antenna with respect to the global x-direction.

The DC voltages at the receiver antennas R1, R2, and R3 may likewise be expressed, for example, as follows when the transmitter T2 fires:

$$V_{DC\_T2R1} = \frac{g_{R_1} g_{T_2} \begin{bmatrix} 2Z_{zz21} + Z_{xx21} \cos\left(\frac{2\pi}{3} + \alpha_R - \alpha_{T_2}\right) + \\ Z_{yy21} \cos\left(\frac{2\pi}{3} + \alpha_R - \alpha_{T_{21}}\right) + \\ Z_{xy21} \sin\left(\frac{2\pi}{3} + \alpha_R - \alpha_{T_2}\right) - Z_{yx21} \sin\left(\frac{2\pi}{3} + \alpha_R - \alpha_{T_2}\right) \end{bmatrix}}{4} \quad (25)$$

$$V_{DC_{T2R2}} = \frac{g_{R_2} g_{T_2} \begin{bmatrix} 2Z_{zz22} + Z_{xx22} \cos(\alpha_R - \alpha_{T2}) + Z_{yy22} \cos(\alpha_R - \alpha_{T2}) + \\ Z_{xy22} \sin(\alpha_R - \alpha_{T2}) - Z_{yx22} \sin(\alpha_R - \alpha_{T2}) \end{bmatrix}}{4}$$

$$V_{DC\_T2R3} = \frac{g_{R_3} g_{T_2} \begin{bmatrix} 2Z_{zz23} + Z_{xx23} \cos\left(\alpha_R - \frac{2\pi}{3} - \alpha_{T2}\right) + Z_{yy13} \cos\left(\alpha_R - \frac{2\pi}{3} - \alpha_{T2}\right) + \\ Z_{xy23} \sin\left(\alpha_R - \frac{2\pi}{3} - \alpha_{T2}\right) - Z_{yx23} \sin\left(\alpha_R - \frac{2\pi}{3} - \alpha_{T2}\right) \end{bmatrix}}{4}$$

Equations 24 and 25 again assume transmitter and receiver tilt angles equal to 45 degrees. While this assumption is valid for some commercial tool embodiments (and tends to simplify the mathematics), the disclosure is not so limited as substantially any suitable transmitter and receiver tilt angles may be employed.

A gain compensated quantity $R_{DC(UHR)}$ may be obtained by computing a ratio of certain ones of the above described three receiver antenna voltage measurements in Equations 24 and 25, for example, as follows:

$$R_{DC(UHR)} = \frac{V_{DC\_T2R1} V_{DC\_T2R3} V_{DC\_T1R2} V_{DC\_T1R2}}{V_{DC\_T2R2} V_{DC\_T2R2} V_{DC\_T1R1} V_{DC\_T1R3}} \quad (26)$$

It will be understood from Equations 23 and 24 that inversion of $R_{DC(3)}$ may require knowledge of the alignment angles between the receivers and the transmitters T1 and T2, for example, $\alpha_R - \alpha_{T1}$ and $\alpha_R - \alpha_{T2}$. These angles may be measured prior to deploying the tool in the wellbore or alternatively by taking the difference between toolface measurements made at each transmitter sub. It will be further understood that the compensated measurement $R_{DC(UHR)}$ is similar to the above described down/up measurement. This may be appreciated by evaluating each of the four ratios in Equation 25. When the receiver antenna spacing is significantly less than the transmitter spacing the first and second ratios behave similarly to a down/up measurement in a one dimensional formation. This may be expressed mathematically, for example, as follows:

$$\frac{V_{DC\_T2R1}}{V_{DC\_T2R2}} = \frac{g_{R1} \left[ -Z_{zz23} + \frac{Z_{xx23} + Z_{yy23}}{2} \left( \frac{\cos\alpha 2}{2} + \frac{\sqrt{3} \sin\alpha 2}{2} \right) \right]}{g_{R2} \left[ Z_{zz22} + \frac{Z_{xx22} + Z_{yy22}}{2} \right]} \quad (27)$$

$$\frac{V_{DC\_T2R3}}{V_{DC\_T2R2}} = \frac{g_{R3}\left[-Z_{zz23} + \frac{Z_{xx21} + Z_{yy21}}{2}\left(\frac{\cos\alpha 2}{2} + \frac{\sqrt{3}\sin\alpha 2}{2}\right)\right]}{g_{R2}\left[Z_{zz22} + \frac{Z_{xx22} + Z_{yy22}}{2}\right]}$$

where $\alpha 2 = \alpha_R - \alpha_{T2}$. The third and fourth ratios may be shown to be insensitive to the formation resistivity when the transmitter T1 is close to the receiver antennas (as compared to transmitter T2), for example, as follows:

$$\frac{V_{DC\_T1R2}}{V_{DC\_T1R1}} = \frac{V_{DC\_T1R2}}{V_{DC\_T1R3}} = \frac{g_{R2}\left(1 + \frac{\cos\alpha 1}{2}\right)}{g_{R1}\left[-1 + \left(\frac{\sqrt{3}\cos\alpha 1}{4} + \frac{\sin\alpha 1}{4}\right)\right]} \quad (28)$$

where $\alpha 1 = \alpha_R - \alpha_{T1}$. Examination of Equations 27 and 28 indicates that the gain compensated measurement quantity $R_{DC(UHR)}$ (disclosed in Equation 26) has a similar response to the following combination:

$$\frac{Z_{zz} - \frac{Z_{xx} + Z_{yy}}{2}}{Z_{zz} + \frac{Z_{xx} + Z_{yy}}{2}}$$

An alternative compensated quantity $R_{DC(UHA)}$ may be obtained by computing a ratio of certain ones of the above described three receiver antenna voltage measurements in Equations 24 and 25, for example, as follows:

$$R_{DC(UHA)} = \frac{(V_{DC\_T1R1} + V_{SHC\_T1R1})}{(V_{DC\_T1R2} + V_{SHC\_T1R2})(V_{DC\_T1R3} + V_{SHC\_T1R3})} \quad (29)$$
$$\frac{(V_{DC\_T1R1} - V_{SHC\_T1R1})}{(V_{DC\_T1R2} - V_{SHC\_T1R2})(V_{DC\_T1R3} - V_{SHC\_T1R3})}$$

It will be understood that the gain compensated measurement quantity $R_{DC(UHA)}$ (disclosed in Equation 28) has a similar response to the following combination:

$$\frac{Z_{zz} - Z_{xx}}{Z_{zz} - Z_{yy}}$$

The disclosed embodiments are now described in further detail with respect to the following non-limiting examples in FIGS. 4-6. These examples are analytical (mathematical) and were computed using Equations 20-28 via software code developed using a point dipole model. The receiver antennas R1, R2, and R3 were collocated and the tilt angles of each antenna T1, T2, R1, R2, and R3 was 45 degrees. The formation had a horizontal resistivity of 2 ohm·m and a vertical resistivity of 5 ohm·m at negative depths and a horizontal and vertical resistivity of 2000 ohm·m at positive depths. The relative dip angle was 0 degrees for the examples depicted on FIGS. 4 and 5 and 30 degrees for the example depicted on FIG. 6. The excitation frequency was 2.0 kHz.

Figure 4A:
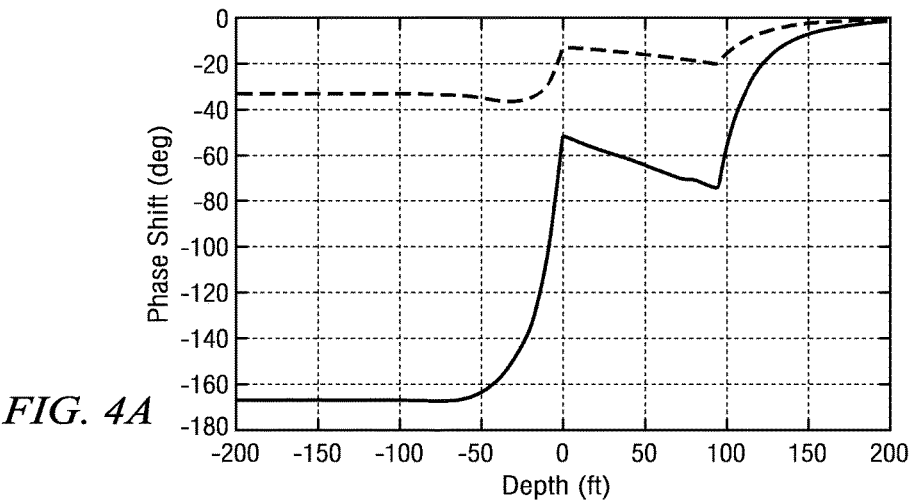
FIGS. 4A and 4B (collectively FIG. 4) depict the gain compensated quantity $R_{DC(UHR)}$ phase shift and attenuation (solid) versus relative depth.
Figure 4B:
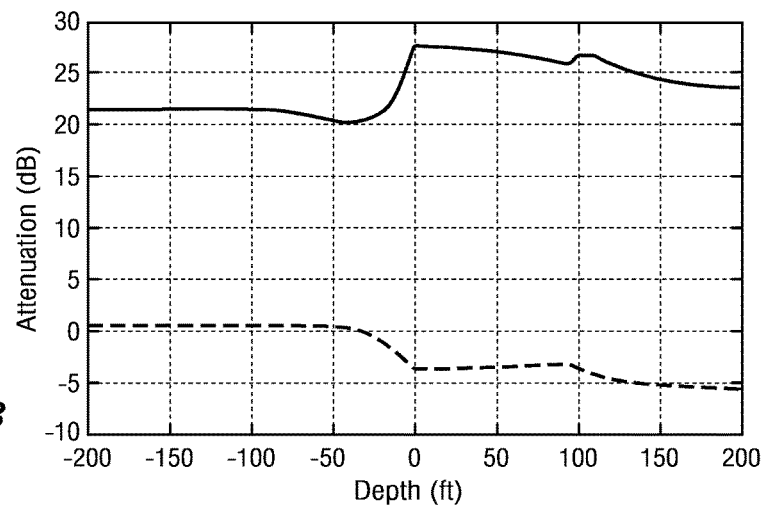

FIGS. 4A and 4B (collectively FIG. 4) depict the gain compensated quantity $R_{DC(UHR)}$ phase shift and attenuation (solid) versus relative depth. FIGS. 4A and 4B also depict conventional harmonic resistivity (UHR) phase shift and attenuation (dashed). It will be appreciated that the conventional UHR measurement is equivalent to a $2Z_{zz}/(Z_{xx}+Z_{yy})$ coupling, for example, as disclosed in commonly assigned U.S. Patent Publications 2011/0133740 and 2011/0238312. The alignment angles between the receiver and the T1 and T2 transmitters were 288 degrees and 51 degrees respectively. As depicted, the gain compensated $R_{DC(UHR)}$ phase shift and attenuation measurements are sensitive to the boundary (at 0 ft) and are similar in response to the conventional UHR measurement.

Figure 5A:
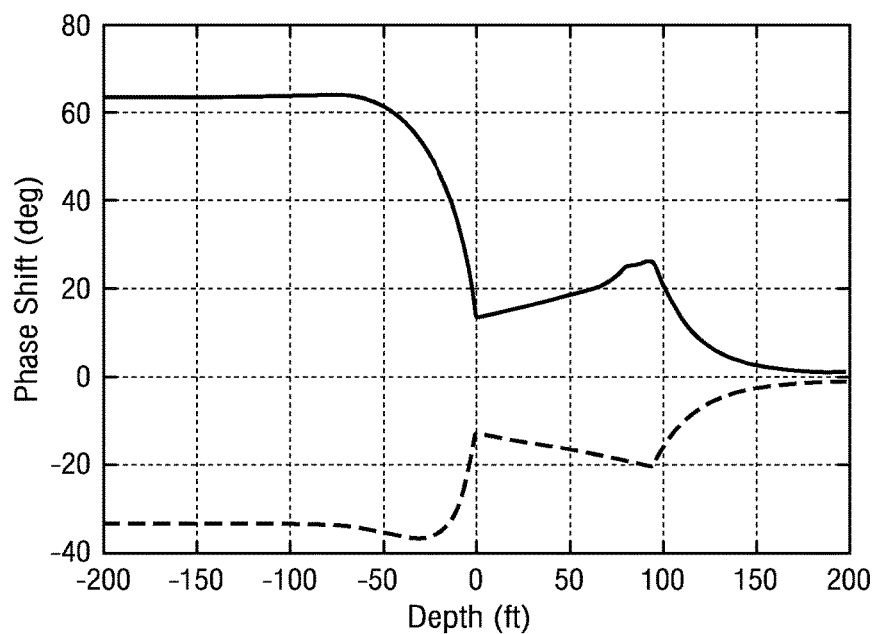
FIGS. 5A and 5B (collectively FIG. 5) also depict the gain compensated quantity $R_{DC(UHR)}$ phase shift and attenuation (solid) versus relative depth.
Figure 5B:
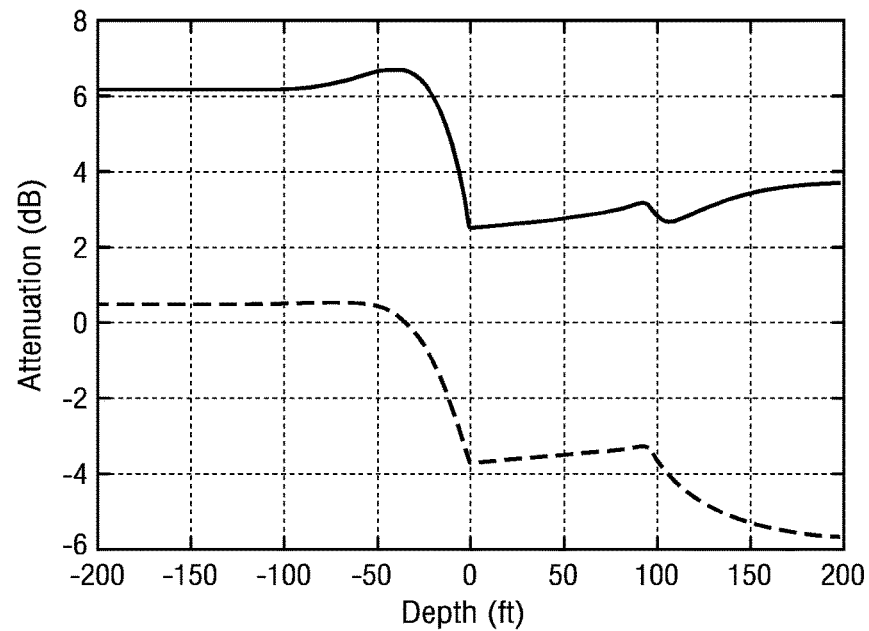

FIGS. 5A and 5B (collectively FIG. 5) also depict the gain compensated quantity $R_{DC(UHR)}$ phase shift and attenuation (solid) versus relative depth. FIGS. 5A and 5B also depict conventional harmonic resistivity (UHR) phase shift and attenuation (dashed). The alignment angles between the receiver and the T1 and T2 transmitters were 345 degrees and 175 degrees respectively. As depicted, the gain compensated $R_{DC(UHR)}$ phase shift and attenuation measurements are sensitive to the boundary (at 0 ft) and are similar in response to the conventional UHR measurement.

Figure 6A:
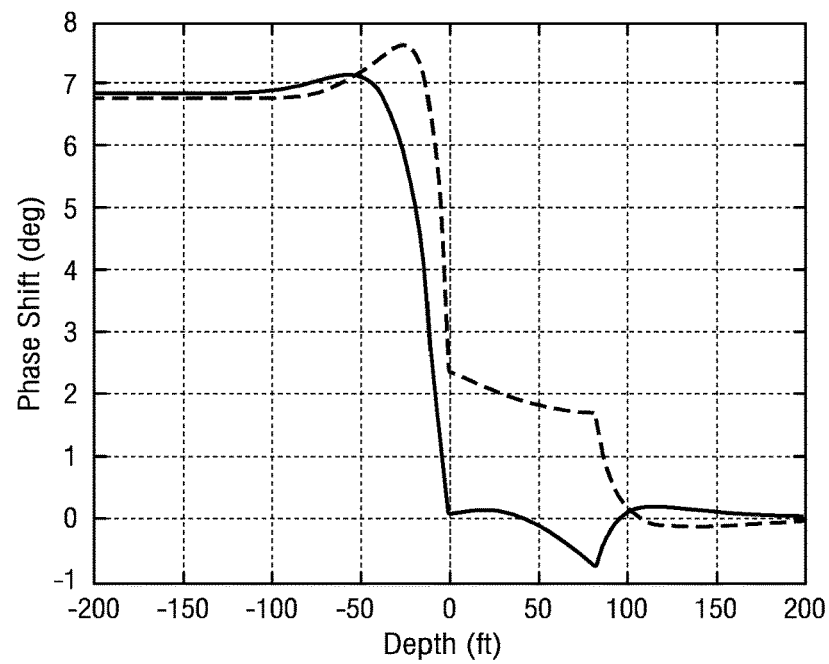
FIGS. 6A and 6B (collectively FIG. 6) depict the gain compensated quantity $R_{DC(UHA)}$ phase shift and attenuation (solid) versus relative depth.
Figure 6B:
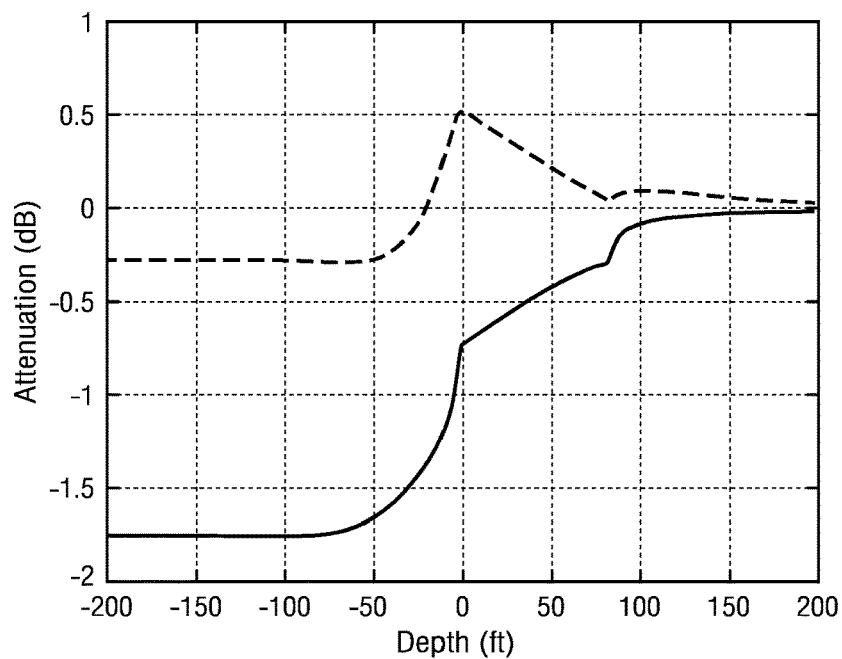

FIGS. 6A and 6B (collectively FIG. 6) also depict the gain compensated quantity $R_{DC(UHA)}$ phase shift and attenuation (solid) versus relative depth. FIGS. 6A and 6B also depict conventional harmonic anisotropy (UHA) phase shift and attenuation (dashed). It will be appreciated that the conventional UHA measurement is equivalent to a $Z_{xx}/Z_{yy}$ coupling, for example, as also disclosed in commonly assigned U.S. Patent Publications 2011/0133740 and 2011/0238312. The alignment angle between the receiver and the T1 was 11 degrees. As depicted, gain compensated $R_{DC(UHA)}$ phase shift and attenuation measurements are sensitive to the boundary (at 0 ft) and are similar in response to the conventional UHA measurement.

It will be understood that the various methods disclosed herein for obtaining fully gain compensated quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the fully gain compensated quantities may be stored in downhole memory and/or transmitted to the surface while drilling via known telemetry techniques (e.g., mud pulse telemetry or wired drill pipe). Alternatively, the harmonic fitting coefficients may be transmitted uphole and the compensated quantities may be computed at the surface using a surface processor. Whether transmitted to the surface or computed at the surface, the quantity may be utilized in an inversion process (along with a formation model) to obtain various formation parameters as described above.

Although gain compensated measurements using tilted antennas have been described in detail, it should be understood that various changes, substitutions and alternations can be made herein without departing from the spirit and scope of the disclosure as defined by the appended claims.

What is claimed is:

1. A method for making downhole electromagnetic logging while drilling measurements, the method comprising
   (a) rotating an electromagnetic logging while drilling tool in a subterranean wellbore, the logging while drilling tool including at least first and second tilted transmitter antennas longitudinally spaced along a logging while drilling tool body and at least first and second tilted receiver antennas;
   (b) acquiring a plurality of electromagnetic voltage measurements from the first and second tilted receiver antennas while rotating in (a), the measurements including at least first, second, third, and fourth measurements, the first measurement including a coupling between the first transmitter and the first receiver, the second measurement including a coupling between the first transmitter and the second receiver, the third measurement including a coupling between the second transmitter and the first receiver, and the fourth measurement including a coupling between the second transmitter and the second receiver;

(c) processing the voltage measurements acquired in (b) to compute harmonic voltage coefficients;

(d) processing ratios of selected ones of the harmonic voltage coefficients of the first, second, third, and fourth measurements to compute at least one gain compensated measurement quantity.

2. The method of claim 1, wherein the processing in (d) is performed by a downhole processor.

3. The method of claim 1, wherein the first and second receiver antennas are collocated.

4. The method of claim 1, wherein the first and second transmitter antennas have substantially equal tilt angles and substantially equal alignment angles.

5. The method of claim 1, wherein the first and second receiver antennas have substantially equal tilt angle magnitudes and opposite tilt angle signs such that $\beta_{R1} = -\beta_{R2}$, wherein $\beta_{R1}$ and $\beta_{R2}$ represent the tilt angles of the first and second receiver antennas.

6. The method of claim 1, wherein (d) comprises processing a ratio of DC voltage coefficients to obtain a gain compensated DC measurement quantity.

7. The method of claim 6, wherein the gain compensated DC measurement quantity is computed in (d) using the following mathematical equation:

$$R_{DC} = \frac{V_{DC\_T1R2} \cdot V_{DC\_T2R1}}{V_{DC\_T1R1} \cdot V_{DC\_T2R2}}$$

wherein $R_{DC}$ represents the gain compensated DC measurement quantity, $V_{DC\_T1R1}$ and $V_{DC\_T1R2}$ represent the DC voltage coefficients of the first and second measurements, and $V_{DC\_T2R1}$ and $V_{DC\_T2R2}$ represent the DC voltage coefficients of the third and fourth measurements.

8. The method of claim 1, wherein (d) comprises processing a ratio of a first harmonic cosine or a first harmonic sine voltage coefficient to a DC voltage coefficient to obtain gain compensated symmetrized and anti-symmetrized measurement quantities.

9. The method of claim 8, wherein the gain compensated symmetrized and anti-symmetrized measurement quantities are computed in (d) using at least one of the following mathematical equations:

$$S_1 = \frac{V_{FHC\_T1R2}}{V_{DC\_T1R2}}$$

$$S_2 = \frac{V_{FHS\_T1R2}}{V_{DC\_T1R2}}$$

$$A_1 = \frac{V_{FHC\_T1R1}}{V_{DC\_T1R1}}$$

$$A_2 = \frac{V_{FHS\_T1R1}}{V_{DC\_T1R1}}$$

wherein $S_1$ and $S_2$ represent first and second gain compensated symmetrized measurement quantities, $A_1$ and $A_2$ represent first and second gain compensated anti-symmetrized measurement quantities, $V_{DC\_T1R1}$, $V_{FHC\_T1R1}$, and $V_{FHS\_T1R1}$ represent the DC, first harmonic cosine, and first harmonic sine voltage coefficients of the first measurement, $V_{DC\_T1R2}$, $V_{FHC\_T1R2}$, and $V_{FHS\_T1R2}$ represent the DC, first harmonic cosine, and first harmonic sine voltage coefficients of the second measurement.

10. The method of claim 1, wherein (d) comprises processing a ratio including at least one of a second harmonic cosine and a second harmonic sine voltage coefficient to obtain a gain compensated measurement quantity that is related to an xx−yy coupling, an xy+yx coupling, or an xx/yy coupling.

11. The method of claim 10, wherein the gain compensated measurement quantity is computed in (d) using at least one of the following mathematical equations:

$$R_{xx-yy(1)} = \frac{V_{SHC\_T1R1}}{V_{DC\_T1R1}}$$

$$R_{xx-yy(2)} = \frac{V_{SHC\_T1R2}}{V_{DC\_T1R2}}$$

$$R_{xy-yx(1)} = \frac{V_{SHS\_T1R1}}{V_{DC\_T1R1}}$$

$$R_{xx+yy(2)} = \frac{V_{SHS\_T1R2}}{V_{DC\_T1R2}}$$

$$R_{xx/yy(1)} = \frac{V_{DC\_T1R1} + V_{SHC\_T1R1}}{V_{DC\_T1R1} - V_{SHC\_T1R1}}$$

$$R_{xx/yy(2)} = \frac{V_{DC\_T1R2} + V_{SHC\_T1R2}}{V_{DC\_T1R2} - V_{SHC\_T1R2}}$$

wherein $R_{xx-yy(1)}$ and $R_{xx-yy(2)}$ represent first and second gain compensated quantities related to the xx-yy coupling, $R_{xy+yx(1)}$ and $R_{xy+yx(2)}$ represent first and second gain compensated quantities related to the xy+yx coupling, $R_{xx/yy(1)}$ and $R_{xx/yy(2)}$ represent first and second gain compensated quantities related to the xx/yy coupling, $V_{DC\_T1R1}$, $V_{SHC\_T1R1}$, and $V_{SHS\_T1R1}$ represent the DC, second harmonic cosine, and second harmonic sine voltage coefficients of the first measurement, and $V_{DC\_T1R2}$, $V_{SHC\_T1R2}$, and $V_{SHS\_T1R2}$ represent the DC, second harmonic cosine, and second harmonic sine voltage coefficients of the second measurement.

12. The method of claim 1, wherein the first and second transmitter antennas have substantially equal tilt angles and substantially different alignment angles.

13. The method of claim 12, wherein the logging while drilling tool comprises at least first, second, and third tilted receiver antennas.

14. The method of claim 13, wherein the first, second, and third receiver antennas have substantially equal tilt angle magnitudes and alignment angles spaced at about 120 degree intervals.

15. The method of claim 13, wherein (d) comprises processing a ratio of DC voltage coefficients to obtain a gain compensated DC measurement quantity.

16. The method of claim 15, wherein the gain compensated DC measurement quantity is computed in (d) using the following mathematical equation:

$$R_{DC(UHR)} = \frac{V_{DC\_T2R1} V_{DC\_T2R3} V_{DC\_T1R2} V_{DC\_T1R2}}{V_{DC\_T2R2} V_{DC\_T2R2} V_{DC\_T1R1} V_{DC\_T1R3}}$$

wherein $R_{DC(UHR)}$ represents the gain compensated DC measurement quantity, $V_{DC\_T1R1}$, $V_{DC\_T1R2}$, and $V_{DC\_T1R3}$ represent the DC voltage coefficients obtained at the first, second, and third receiver antennas when the first transmitter fires, and $V_{DC\_T2R1}$, $V_{DC\_T2R2}$, and $V_{DC\_T2R3}$ represent the DC voltage coefficients obtained at the first, second, and third receiver antennas when the second transmitter antenna fires.

17. The method of claim 13, wherein (d) comprises processing a ratio including DC and second harmonic cosine voltage coefficients to obtain the gain compensated measurement quantity.

18. The method of claim 17, wherein the gain compensated measurement quantity is computed in (d) using the following mathematical equation:

$$R_{DC(UHA)} = \frac{\dfrac{(V_{DC\_T1R1} + V_{SHC\_T1R1})}{(V_{DC\_T1R2} + V_{SHC\_T1R2})(V_{DC\_T1R3} + V_{SHC\_T1R3})}}{\dfrac{(V_{DC\_T1R1} - V_{SHC\_T1R1})}{(V_{DC\_T1R2} - V_{SHC\_T1R2})(V_{DC\_T1R3} - V_{SHC\_T1R3})}}$$

wherein $R_{DC(UHA)}$ represents the gain compensated measurement quantity, $V_{DC\_T1R1}$, $V_{DC\_T1R2}$, and $V_{DC\_T1R3}$ represent the DC voltage coefficients obtained at the first, second, and third receiver antennas when the first transmitter fires, and $V_{SHC\_T1R1}$, $V_{SHC\_T1R2}$, and $V_{SHC\_T1R3}$ represent the second harmonic cosine voltage coefficients obtained at the first, second, and third receiver antennas when the first transmitter fires.

\* \* \* \* \*